United States Patent [19]

Hawkins

[11] Patent Number: 4,586,429
[45] Date of Patent: May 6, 1986

[54] FOOD DISPENSER

[75] Inventor: John Hawkins, Brookvale, Australia

[73] Assignee: Cubi Cubes Pty. Limited, Australia

[21] Appl. No.: 648,156

[22] PCT Filed: Dec. 22, 1983

[86] PCT No.: PCT/AU83/00193
§ 371 Date: Aug. 21, 1984
§ 102(e) Date: Aug. 21, 1984

[87] PCT Pub. No.: WO84/02457
PCT Pub. Date: Jul. 5, 1984

[30] Foreign Application Priority Data

Dec. 24, 1982 [AU] Australia .................. PF7415

[51] Int. Cl.$^4$ .............................................. A47J 37/12
[52] U.S. Cl. ........................................ 99/407; 222/368
[58] Field of Search .................. 99/403, 407, 356, 336;
222/354, 358, 368; 426/523

[56] References Cited

U.S. PATENT DOCUMENTS

| 3,274,920 | 9/1966 | Benson | 99/407 X |
| 3,448,677 | 6/1969 | Dexters | 99/407 X |
| 3,667,373 | 6/1972 | Sicher | 99/407 |
| 3,690,247 | 9/1972 | Van Cleven | 99/407 X |
| 3,730,397 | 5/1973 | Magnus | 222/368 |
| 3,896,715 | 7/1975 | Mascret | 99/407 X |
| 4,359,935 | 11/1982 | Murray | 99/407 X |

FOREIGN PATENT DOCUMENTS

2453628 12/1980 France ................... 99/407

Primary Examiner—Billy J. Wilhite
Attorney, Agent, or Firm—Silverman, Cass, Singer & Winburn, Ltd.

[57] ABSTRACT

Automatic food dispensing apparatus comprises a hopper (4), a rotatable cylinder (12) having a recess for receiving and dispensing a predetermined amount of food to a food container (40) in the form of a perforated metal rectangular container, the container being movable between a rest position, a first portion in which the container is disposed in a food cooker (26) for cooking the food dispensed in the container, and a second position in which the container (4) is held above a food dispenser (76) so that the food in the container is dispensed to a cup (76). The container (40) has a pivotable base (44) and spring clips (50) along one side which hold the base (44) in place. In the first position in the cooker (26), a spring metal strip holds the base in place and defines the lower limit of movement of the base. In the second position in the cooker, the clips (5) engage a metal bar (92) for releasing the clips and the base (44).

11 Claims, 6 Drawing Figures

FOOD DISPENSER

TECHNICAL FIELD

This invention relates to apparatus for automatically cooking and dispensing food.

BACKGROUND ART

Automatic coin operated chip frying and dispensing machines are known. Since machines are disclosed in Australian Patent Specifications Nos 53517/79, 64054/80, 60237/80 and 77603/81.

DISCLOSURE OF INVENTION

The present invention was devised in an effort to provide apparatus for automatically cooking and dispensing food which is compact, simple in construction, reliable and inexpensive.

The present invention therefore provides apparatus for automatically cooking and dispensing food comprising a hopper for storing food, means for metering a predetermined amount of food from the hopper into a food container, the food container being movable between first and second positions, the food container in its first position being disposed within a food cooker, and the food container in its second position being disposed in a position for depositing food in a dispensing means for the food, and the food container having a base which is pivotable so as to be movable between an open and closed position, and means arranged and disposed to coact with the base so that the base is closed in the first position of the food container so that food metered into the food container is held and cooked in the container but the base is open in the second position of the container, so that the food in the food container is deposited into said dispensing means.

By providing in accordance with the invention a food container having a base which is movable between an open and closed position and is held in the closed position when the food container is in the cooker so as to retain food in the container and is in the open position when the food container is in the second position to permit the food to fall to the dispensing means, an apparatus is provided with much improved simplicity and efficiency. This is because no complicated means are necessary to move the food container, on account of the pivotable base of the food container. All that is required is movement of the cooking basket in an upright position between the first and second positions, and this can simply be carried out by means of for example as preferred parallel linkages.

As preferred means for closing the base of the food container when the container is disposed in the cooker in its first position, comprises a resilient metal strip against which the free edge of the base of the food container engages when the food container is moved from a rest position to its first position. When the food container is moved to its second position, the base of the food basket is clear of the resilient metal strip and the base is therefore permitted to fall freely under gravity to permit the contents of the food basket to fall to a dispensing means. Preferably in addition spring clips are provided to fasten the base to the front or side walls of the container in the first position of the container, means being provided, such as fixed projections, to engage and release the base of the container in the second position.

Preferably the free edge of the base of the cooking basket has a channel in order to catch cooking oil dripping down the base of the cooking basket. The channel may have drainage holes to permit oil to drain away from the channel.

As preferred, the food container is stopped in a third position after the chips have been cooked, the third position being immediately above the bath of oil so as to permit excess oil to drain back from the container into the bath.

As preferred the means for metering a predetermined quantity of food from the hopper comprises a rotatable cylinder having a recess in the form of a quadrant, mounted in a discharge chute at the base of the hopper. In the stationary position of the metering means the quadrant recess is facing upwardly into the hopper so that the food in the hopper falls under gravity into the quadrant recess. When the cylinder is rotated, the food in the quadrant recess is rotated with the cylinder to a position in which the food falls vertically downwardly from the recess into the food basket. Preferably a wall of the discharge chute is formed to follow the contour of the cylinder over a substantial arc around the bottom of the cylinder so as to prevent food falling through the discharge chute of the hopper which is not within the quadrant.

Where food other than chips are to be dispensed, the cylinder device may have a recess shaped other than a quadrant. The cylinder may have a recess shaped to accept a portion of food, such as a sausage or a fish chunk to permit the efficient dispensing of the food item.

The apparatus is also specifically designed so that the parts are readily disassembled for cleaning. This is both for hygienic purposes and for increasing the reliability of the apparatus through preventing the build up of fat and food pieces.

BRIEF DESCRIPTION OF DRAWINGS

A preferred embodiment of the invention will now be described with reference to the accompanying drawings wherein.

BEST MODE FOR CARRYING OUT THE INVENTION

Referring now to the drawings, there is shown a food cooking apparatus for automatically cooking chips. The apparatus may be operated upon insertion of a coin or coins into a coin mechanism or alternatively the apparatus may be under the control of an operator and may be actuated by an electrical switch.

The apparatus comprises a rectangular cabinet 2 housing the working parts of the apparatus. The working parts of the apparatus comprise a hopper 4 containing chips connected to a discharge chute 6 by wing nuts or clevis pins to permit easy removal of the hopper. The hopper may be removed for cleaning purposes or for replacing the hopper with a different type of hopper where a different type of food stuff is to be used in the apparatus. A metering device 10 is disposed in discharge chute 6 and comprises a cylinder 12 rotatable about an axis 14 and having a recess 16 along its length in the shape of a quadrant. Quadrant 16 is movable in an clockwise direction by means of a sprocket and chain assembly 18 driven by an electric motor 17 from the position shown in FIG. 2 to a vertically downward position shown in FIG. 3. An edge 19 of recess 16 has projecting serrations for cutting chips. A bottom portion 20 of the discharge chute wraps around the bottom of the cylinder 12 in order to prevent chips from falling through the chute. The weight of the chips in the hopper press a quantity of chips into the quadrant recess. In use when the cylinder is rotated, the chips in the recess are moved to the vertically downwards position and thence fall under gravity. Serrated edge 19 serves to cut any chips only partly in recess 16 as the cylinder is rotated.

The discharge chute 6 is removably coupled to axle 14 and is mounted on axle 14 by means of slots 21 so that the discharge chute may be lifted off the axle 14 for cleaning purposes.

Figure 5:
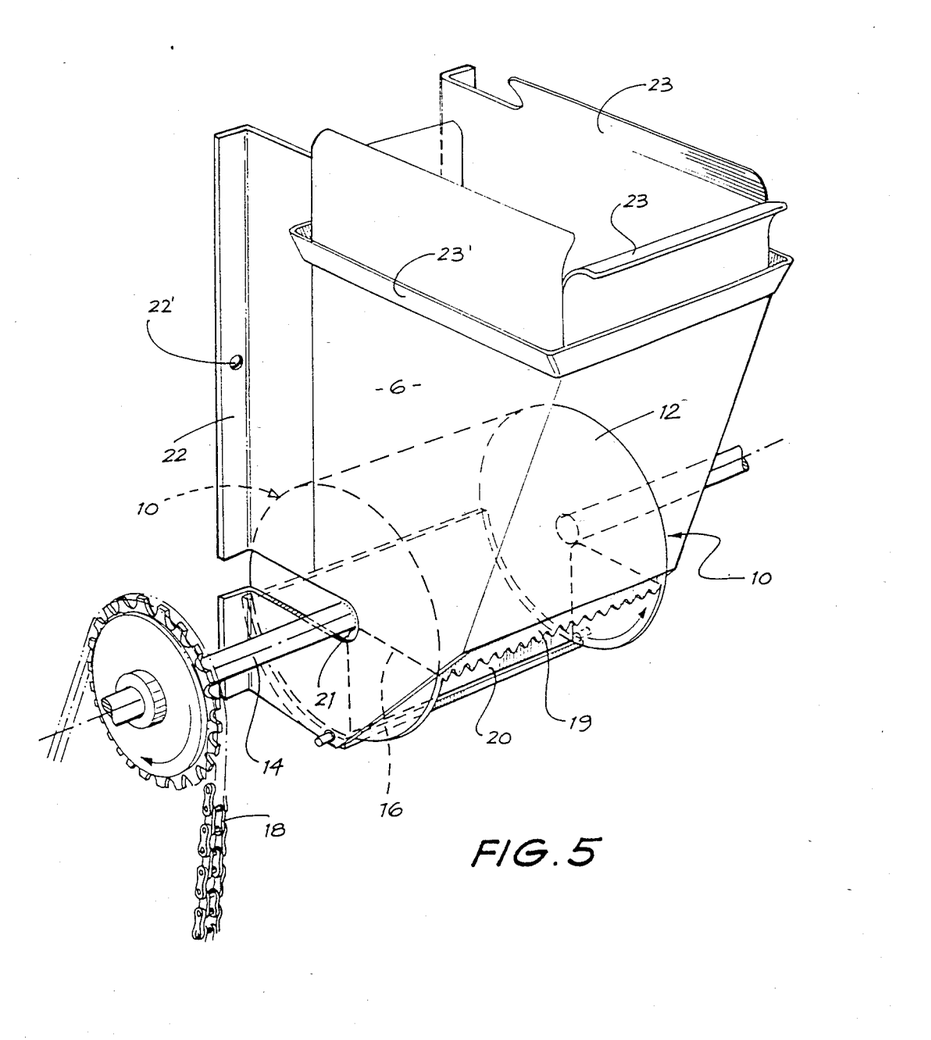
FIGS. 5 and 6 are perspective views of the apparatus of FIG. 1, but with modified food and cup dispensing mechanisms.
Figure 6:
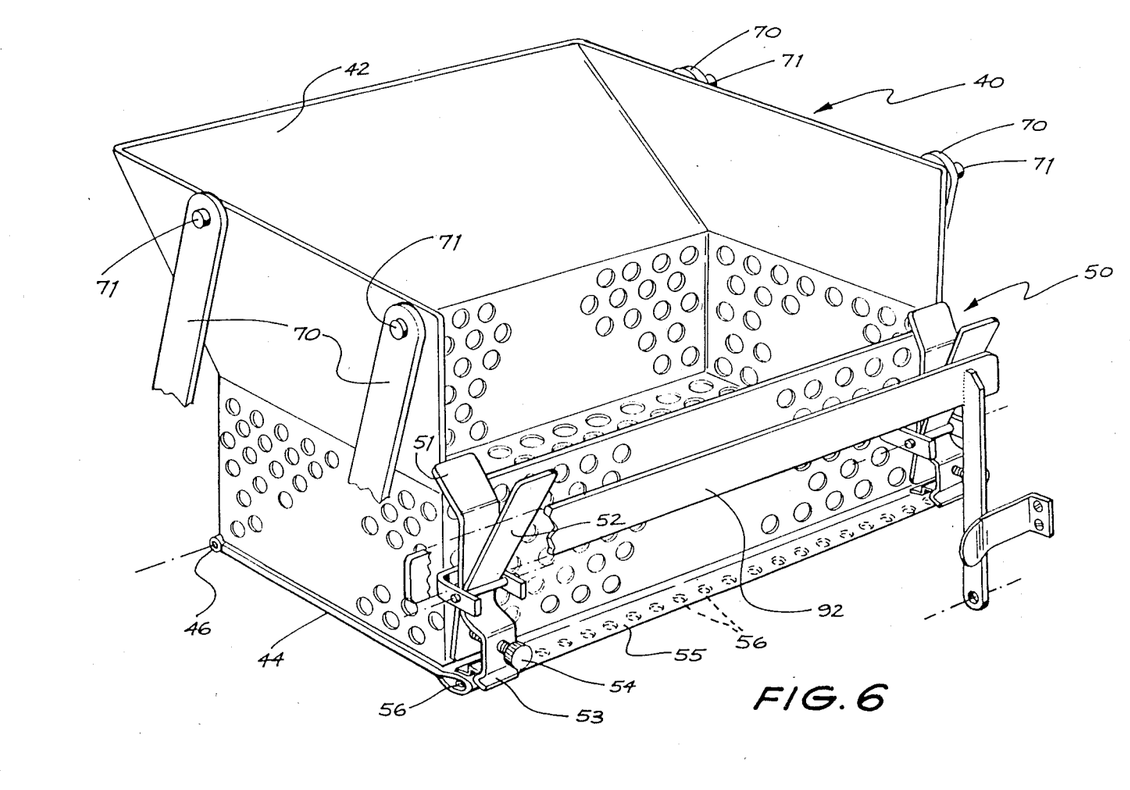

As shown in FIG. 5, the discharge chute is mounted to the cabinet by channels (not shown) in which flanges 22 are disposed so that the chute can be removed for cleaning purposes. In addition the flanges 22 have apertures 22′ for receiving pins (not shown) for mounting the discharge chute. These pins may be provided as an alternative to the channels. The top of the chute has flanges 23 for positioning the discharge chute 6 to hopper 4.

The axle 14 is mounted in journals 24 in a metal housing 25 which surrounds the discharge chute and lower portion of the hopper and is connected at its base to a cooker 26. Housing 25 serves to protect other parts of the apparatus from fumes from cooker 26. An exhaust fan 30 is provided to remove fumes from the interior of the cabinet.

The hopper 4 may be surrounded by a refrigeration coil (not shown) in order to cool the chips in the hopper. A removable lid 5 is provided on top of cabinet 2 for refilling hopper 4 with chips. A refrigeration compression unit 31 is mounted at the base of cabinet 2.

Figure 1:
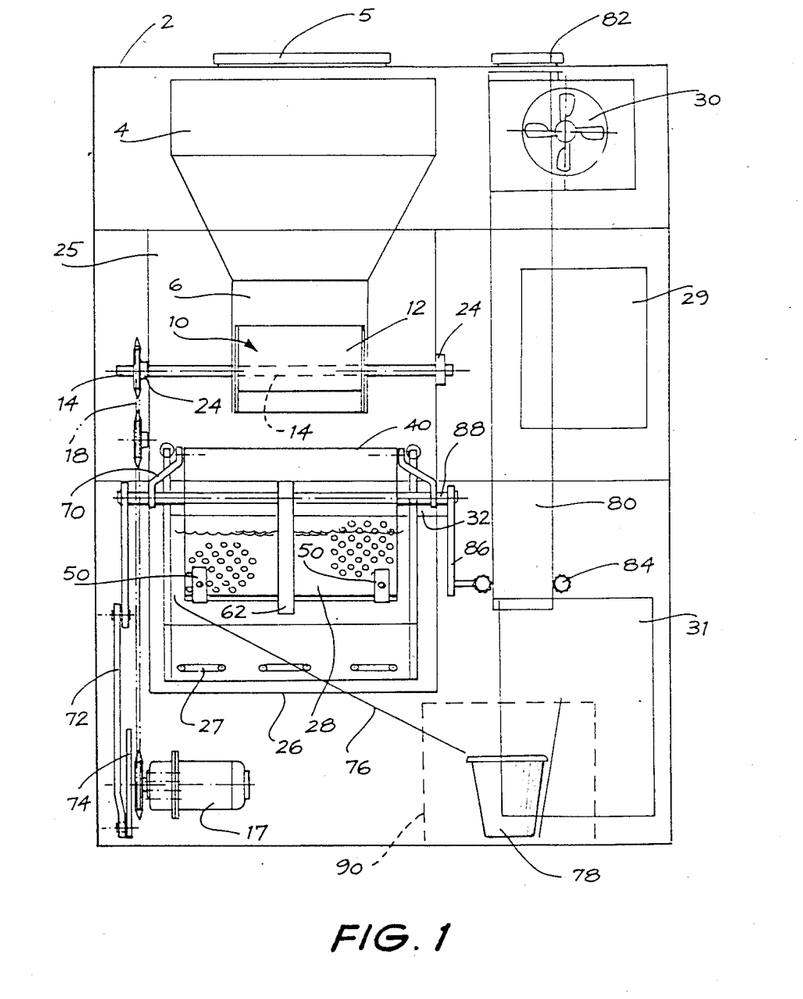
FIG. 1 is a front elevation of the food cooking apparatus according to the present invention.

An electrical control assembly is enclosed in a cover 29 (FIG. 1) to isolate it from the remainder of the apparatus.

The cooker 26 comprises a rectangular stainless steel bowl 28 full of frying oil or other cooking substance such as water which extends nearly to the top of the bowl. A low wattage electric immersion heater 27 is provided in the base of the cooker 26 and has multiple convolutions in order to lengthen the heater so that the desired amount of heating power is provided to the fat but with the element at a lower temperature than is normal in an exposed condition so that in the event that the cooker boils dry, the element will not be glowing red when the oil reaches a dangerously low level and cause the oil to reach flash point. The cooker 26 preferably has gutters 32, 33 along opposite faces of the cooker. Gutters 32, 33 serve to collect fat boiling over when chips are being fried in the cooker and a return path to the bowl 28 is provided.

A food container 40 is generally rectangular and comprises perforated metal side and base walls having a lip 42 which serves to ensure that as chips are deposited into the food container, none are lost over the side wall of the container.

Figure 2:
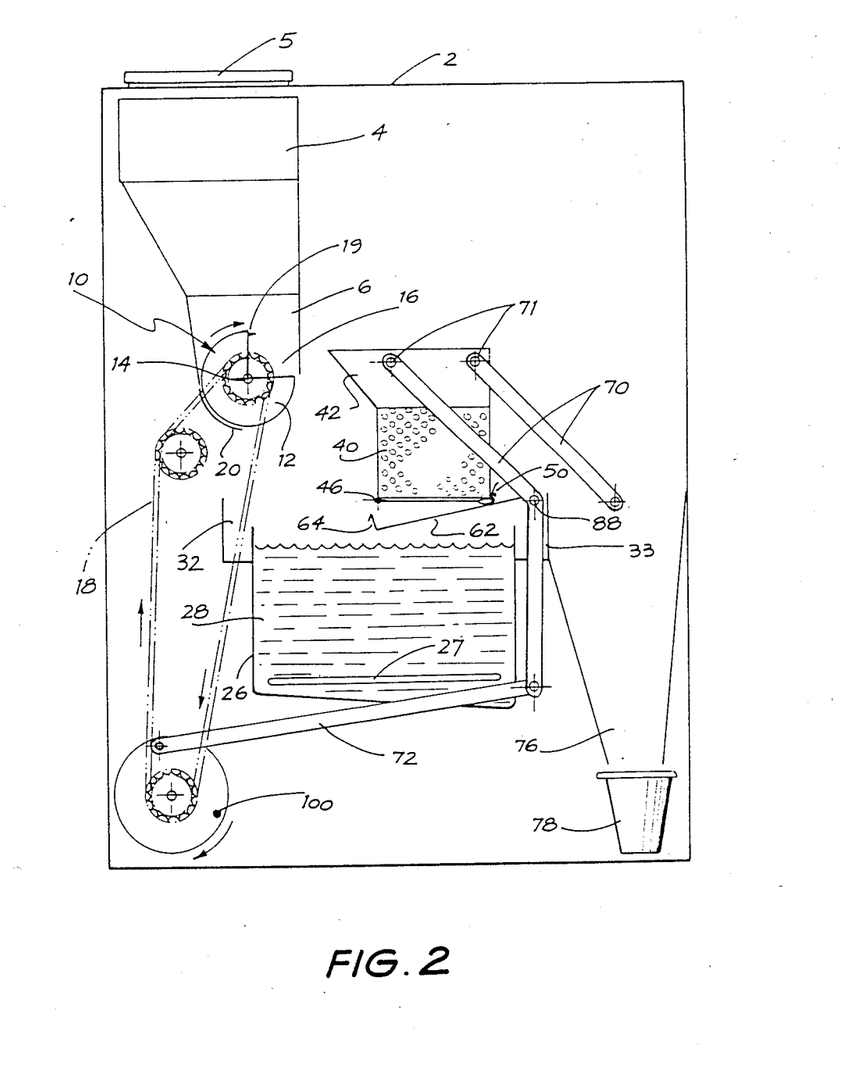
FIGS. 2, 3 and 4 are side elevations of the apparatus according to the invention, certain parts not being shown for clarity.
Figure 3:
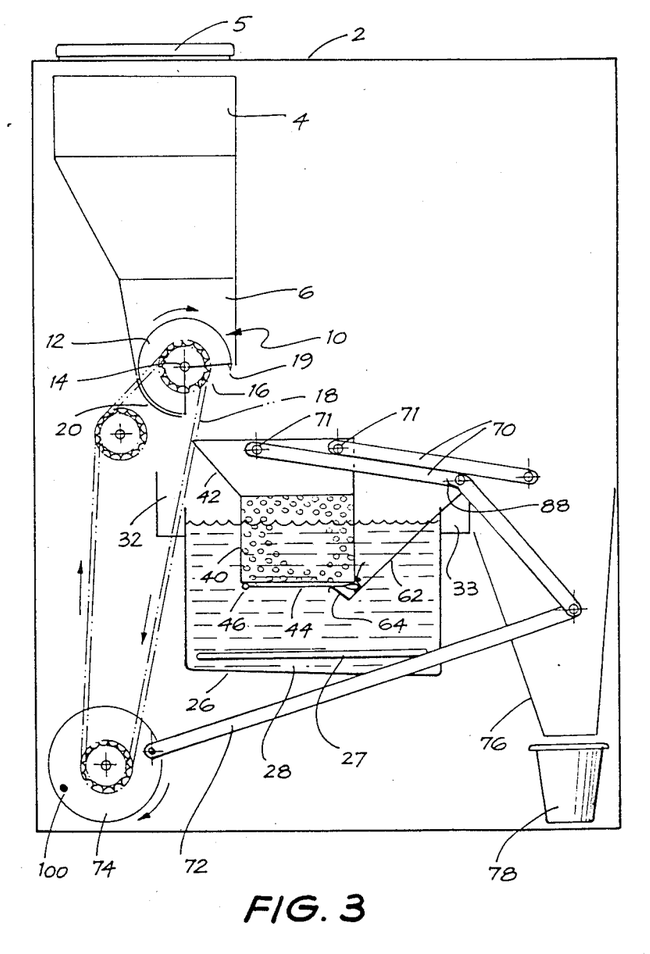
Figure 4:
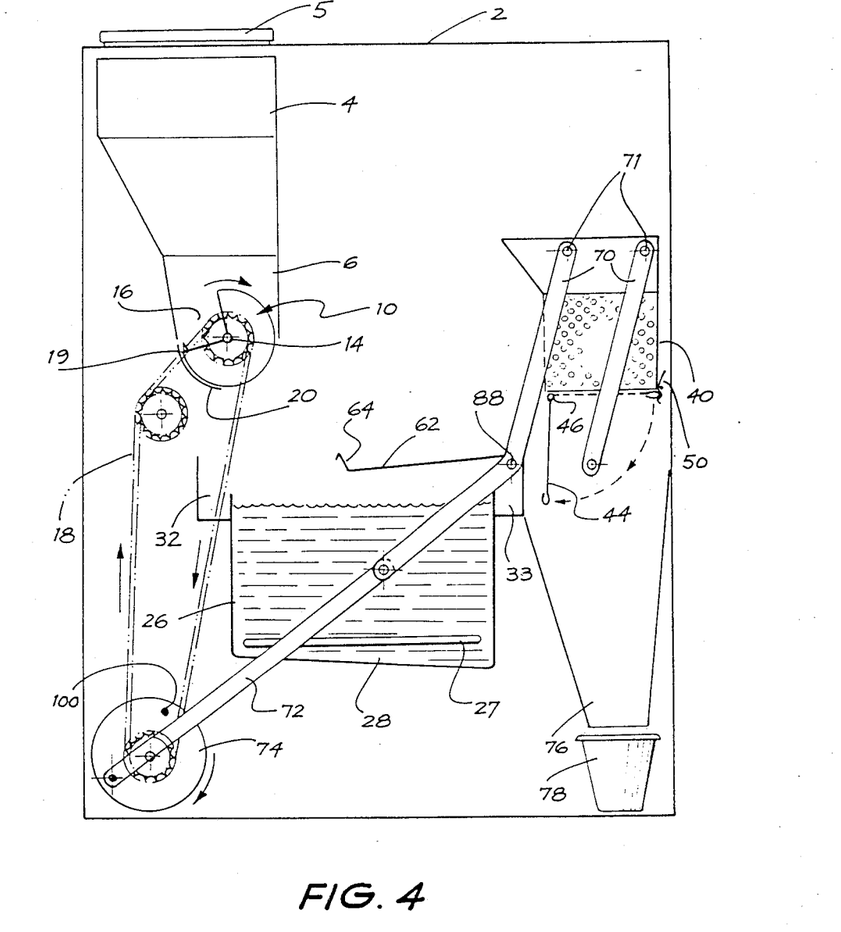

The base of the food container 44 is pivotable along a leading edge 46 from a closed position indicated in FIGS. 2 and 3 to an open position indicated in FIG. 4 where the base wall hangs vertically downwards.

The base wall 44 is held in the closed position by means of spring clips 50 attached to the side walls of the food container and engaging the free edge of the base wall. The spring clips comprise a fixed limb 51 and a spring loaded limp 52. The lower end of limp 52 has a curved portion 53 which engages the free edge of the base wall. An adjustable screw 54 is provided as a limit stop for defining a limit of movement of limb 52. The free edge of the base wall has a gutter 55 disposed on both sides of the base wall in order to collect oil which may drip along the base wall in the open position of the base wall. The gutter has perforations along its length in order to permit draining of the collected oil.

A resilient metal strip 62 is provided which extends from a side wall of the cooker 26 into bowl 28 and terminates in an upturned portion 64. When as shown in FIG. 3 the food container is deposited in cooker 26 the metal strip 62 abuts against the base wall 44 of the container 40 in order firmly to hold the base wall in position. The turned up edge 64 serves to prevent the base wall 44 from sliding off the end of strip 62. The strip is removably mounted for cleaning purposes.

The food container 40 is mounted on parallel linkages 70 for movement between a rest position shown in FIG. 2 when the apparatus is inoperative, a first position as shown in FIG. 3 in which the food container is disposed within the cooker 26, and a second position indicated in FIG. 4 in which the cooker is disposed directly over a dispensing means. Additionally there is a third position (not shown) in which the container 40 is held above the cooker 26 after the chips are cooked in the first position. The container 40 is removably mounted on the parallel linkages 70 by pins (not shown) which are coupled to stub axles 71 extending through the top of the food container. Parallel linkages 70 are driven by a linkage 72 which is connected to a drive disc 74, which is in turn driven by electric motor 17. A drive disc is not essential, and may be replaced by a rotatable arm with the linkage 72 coupled to the end of the arm. However a disc is convenient since it permits the positioning thereon of a peg 100 operating microswitch contacts (described below) to control the operation of the apparatus. The position of the peg 100 may be varied along the disc in order to provide variation of the time at which the various phases of operation of the apparatus are initiated.

The discharge means comprises a chute 76 through which fried chips are deposited into a food holder 78. Food holder 78 is dispensed from a dispensing unit 80 which comprises a cylinder containing a cartridge of food holders. A cover 82 is provided at the top of the cabinet 2 in order to permit the refill of sleeve 80. The base of the sleeve has slots in which teethed cogs 84 penetrate to engage the sides of a food holder whereby rotation of the cogs causes a food holder to be ejected from the sleeve 80 and to fall in position at the base of discharge chute 76. Cogs 84 are actuated by a trip arm 86 which is coupled to an axle 88 from which movement of linkage 72 is transmitted.

A slidable window 90 is provided adjacent the food holder position so that sliding movement of the window permits the food holder to be removed by hand.

As regards electrical controls, these are entirely conventional and will not be described in any great detail. A projection 100 provided on disc 74 rotates to actuate microswitches which control the stages of operation of the device.

In operation the apparatus is started either by insertion of a coin where the device is coin operated or by actuation of an electrical switch where the apparatus is operated by an operator. Operation of the switch causes electrical motor 17 to rotate which in turn causes linkage 72 to move parallel arms 70 so that the food container 40 moves from the rest position shown in FIG. 2 to the first position shown in FIG. 3 wherein the food container is immersed in oil. At the same time as food holder is moved to the first position in the cooker, the chain drive 18 rotates cylinder 12 in an clockwise direction so that quadrant 16 is moved to face vertically downwards. The chips in the quadrant recess are deposited in the food holder during movement of the food holder to its first position in the cooker. When the food holder is disposed in the cooker, the projection 100 disposed on disc 58 engages a microswitch so as to temporarily halt the operation of the motor 17 to permit the food holder to remain in the cooker for a predetermined amount of time sufficient to fry the chips properly.

As the chip holder is moved between rest and first positions, the teethed cogs 84 are actuated to disengage a food holder from the cartridge of food holders so that it is deposited in position beneath the discharge chute 76.

After this predetermined amount of time the motor 17 is re-energised and the linkage 72 operates to move the food holder upwardly from the first position to a second position shown in FIG. 4 where the food holder is vertically above a dispensing chute 76. In this position, the base of the food holder is free of spring 62 and a fixed bar 92 engages the free edge of base wall to force the spring clips 50 to be released so that the base wall 44 falls downwardly and the chips are deposited into chute 76 and thence into food holder 78. An alternative to mounting fixed bar 92 on the cabinet 2, is to provide two projections on parallel linkages 72, so that as the food container 40 moves past the linkages on the way to the second position, the spring clips are disengaged; this is a simple and accurate method of disengagement.

While the container 40 is in the second position, the oil runs down the vertical base wall 44 into gutter 55 disposed on both sides of wall 44 so that upon return of the food container to the normal rest position shown in FIG. 2 the fat disposed in the gutter 55 is permitted to drip into the container.

As preferred, the container 40 may be brought to rest in a third position (not shown) intermediate the first and second positions in which position the food container is held immediately above the cooker 26 to allow excess oil to drip back into cooker 26. This is effected by a further microswitch actuated by peg 100.

The container is thereafter returned to its normal rest position shown in FIG. 2, in which position a second microswitch is operated by projection 100 to deactivate motor 17.

There has been described apparatus for automatically cooking and dispensing food which is compact, reliable, simple in construction and inexpensive. Variations and modifications to the apparatus may be envisaged.

I claim:

1. Apparatus for automatically cooking and dispensing food, the apparatus comprising:
 a hopper for storing the food;
 a food container having a base which is pivotable so as to be moveable between open and closed positions;
 means for metering a predetermined amount of food through the hopper into the food container;
 means for carrying and moving the food container between a first and a second position whilst maintaining the food container in a constant attitude;
 a food cooker containing a fluid such as cooking oil, which cooker is disposed to receive the food container when the food container is in said first position;
 dispensing means into which the food is deposited when the food container is disposed in said second position; and,
 closing means for co-acting with the base of the food container and to close the base when the food container is in said first position so that the food within the food container is retained therein whilst it is being cooked, the closing means comprising a resilient metal strip which is engaged by the base of the food container when the food container is in said first position, and the food container being disengaged from the closing means when in said second position so that food from the food container can be deposited into the dispensing means.

2. Apparatus as claimed in claim 1 wherein the food container and metering means are driven by drive coupling means from a single motor means.

3. Apparatus according to claim 1 wherein the food container includes side walls and wherein spring clips are provided to fasten the base to the side walls of the food container when the food container is in said first position, and wherein fixed projection means are provided to engage and release the base of the food container when it is in said second position.

4. Apparatus according to claim 3 wherein the base of the food container has a free edge which is formed as a channel which functions in use of the apparatus to catch any cooking oil which may drip down along the base of the food container whilst the base is in an open position when the food container is in its said second position.

5. Apparatus according to claim 3 wherein the means for conveying and moving the food container between the first and second positions comprises a plurality of parallel linkages which are disposed on each of two opposite sides of the food container for pivotable movement between the first and second positions.

6. Apparatus according to claim 5 wherein the food container is removably mounted to the parallel linkages.

7. Apparatus according to claim 3 wherein the means for metering a predetermined quantity of the food from the hopper comprises a rotatable cylinder which has a recess in the form of a quadrant, the rotatable cylinder being mounted in a discharge chute in the base of the hopper.

8. Apparatus according to claim 7 wherein the discharge chute is removably mounted to the hopper for cleaning purposes.

9. Apparatus as claimed in claim 3 wherein the dispensing means comprises a chute and wherein the apparatus includes means for locating a food holder at the base of the chute.

10. Apparatus for automatically cooking and dispensing food, the apparatus comprising:
 a hopper for storing the food;

a food container having a base which is pivotable so as to be moveable between open and closed positions;

means for metering a predetermined amount of food from the hopper into the food container;

means for carrying and moving the food container between a first and a second position whilst maintaining the container in a constant attitude;

a food cooker which is disposed to receive the food container when the food container is in said first position;

dispensing means into which the food is deposited when the food container is disposed in said second position; and, closing means for co-acting with the base of the food container and to close the base when the food container is in said first position so that the food within the food container is retained in the container whilst it is being cooked, the food container further having side walls and spring clips to fasten the base to the side walls of the food container when the food container is in said first position; and, fixed projection means for engaging and releasing the base of the food container when it is in said second position so that food from the food container can be deposited into the dispensing means.

11. Apparatus according to claim 10 wherein the closing means comprises a resilient metal strip which is engaged by the base of the food container when the food container is in said first position, the food container being disengaged from the closing means when it is in said second position.

* * * * *